March 16, 1926.
E. B. ANDERSON
VEHICLE COUPLER
Filed August 3, 1925
1,576,803
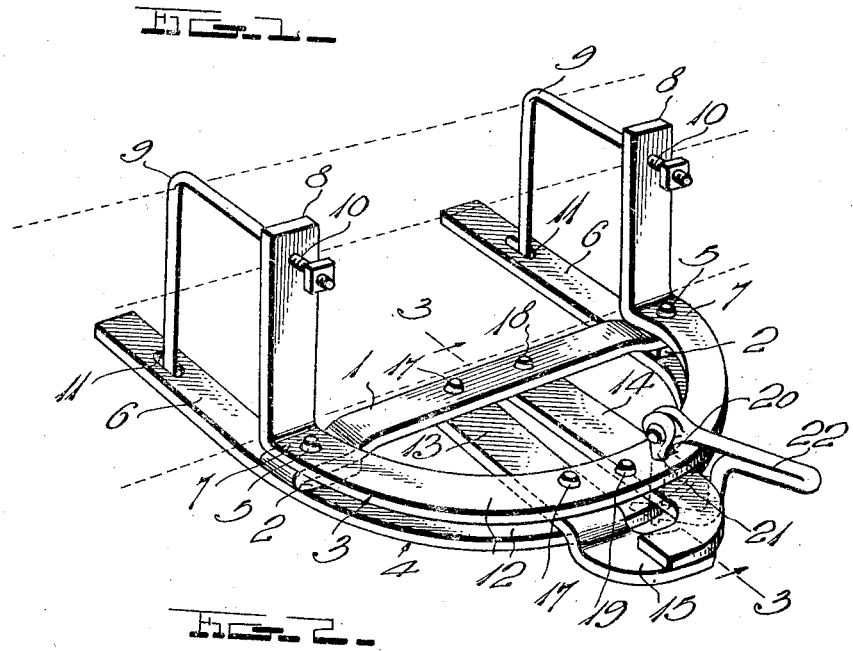
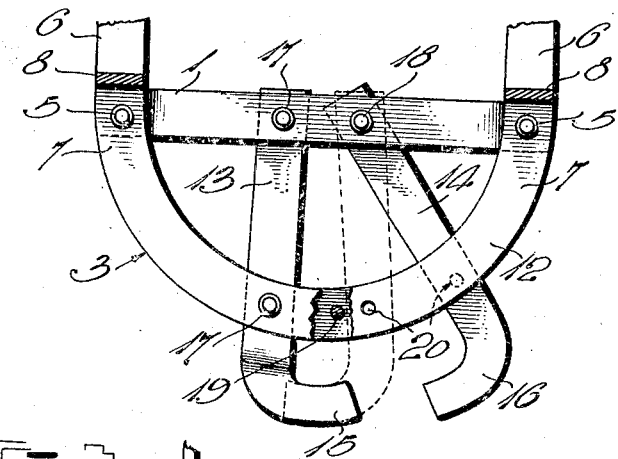
Witness
H. Woodard
Inventor
E. B. ANDERSON
By H. B. Wilson & Co.
Attorneys Patented Mar. 16, 1926.

1,576,803

UNITED STATES PATENT OFFICE.

EDWIN B. ANDERSON, OF TAUNTON, MINNESOTA.

VEHICLE COUPLER.

Application filed August 3, 1925. Serial No. 47,892.

*To all whom it may concern:*

Be it known that I, EDWIN B. ANDERSON, a citizen of the United States, residing at Taunton, in the county of Lyon and State of Minnesota, have invented certain new and useful Improvements in Vehicle Couplers; and I do declare the following to be a full, clear, and exact description of the invention, such as will enable others skilled in the art to which it appertains to make and use the same.

My invention relates to improvements in couplers for connecting vehicles to each other or for connecting practically any desired object to a leading vehicle.

The object of the invention is to provide a coupler of exceptionally simple and inexpensive construction, yet one which will be very desirable and efficient.

With the foregoing in view, the invention resides in the novel subject matter hereinafter described and claimed, the description being supplemented by the accompanying drawing.

Figure 1 is a perspective view.

Figure 2 is a top plan view partly broken away and in section.

Figure 3 is a vertical longitudinal sectional view on line 3—3 of Fig. 1.

In the drawing above briefly described, the numeral 1 designates a substantially straight, horizontally disposed, transverse bar whose ends 2 are preferably folded upon themselves as shown. Upper and lower U-shaped bars 3 and 4 are disposed in horizontal planes and have their arms disposed in contact with the upper and lower sides of the folded end portions of the bar 1, to which they are secured by rivets or the like 5. The arms of the lower bar 4 are designated at 6 and they preferably extend horizontally from the bar 1 to any desired extent. The arms of the upper bar 3 are indicated at 7, and the free ends of these arms are preferably directed vertically upward as indicated at 8. L-shaped clamping bolts 9 have been shown passing through openings 10 in the arm portions 8 and through longitudinal slots 11 in the free ends of the arms 6, said bolts and the free ends of the arms, forming clamps for attaching the device to an axle or a draw-bar. If desired, provision other than that herein disclosed, might be made for attaching the device.

The arm-connecting portions 12 of the bars 3 and 4 are spaced outwardly from the transverse bar 1. Hook shanks 13 and 14 pass between these arm-connecting portions and are disposed longitudinally in substantially parallel relation with the arms of the U-shaped bars. The outer ends of the shanks 13 and 14 are provided with hooks 15 and 16 spaced outwardly from the bar portions 12, the shank 13 is riveted at 17 to the bar 1 and to the aforesaid portions 12, and the shank 14 is pivoted to said bar 1, as indicated at 18, a suitable stop 19 being provided for limiting the inward swinging of said shank 14, toward the shank 13. The bar portions 12 and the shank 14 are formed with openings 20 which are adapted to register with each other when the hook 14 is swung inwardly, the registering openings then receiving a locking pin 21 which holds the coupler in operative position. This locking pin is by preference provided with a pivoted guard or retainer 22 which normally hooks under the lower bar 4 to prevent withdrawal of the pin. By swinging the member 22 upwardly however, the pin 21 may be withdrawn to permit swinging of the shank 14 way from the shank 13, so that a ring or the like on the vehicle to be towed, may be readily engaged with the hooks 15 and 16. Then, the shank 14 is swung back to operative position and locked by the pin 21.

The device is extremely simple and inexpensive, yet is highly efficient and very desirable, and as excellent results are obtainable from the details disclosed, they may well be followed. However, within the scope of the invention as claimed, modifications may be made.

I claim:

1. A vehicle coupler comprising a horizontal transverse bar, upper and lower U-shaped bars disposed in spaced horizontal planes and having their arms longitudinally disposed and secured to the upper and lower sides of said transverse bar, the arm-connecting portions of said U-shaped bars being horizontally spaced from said transverse bar, a pair of horizontal hook shanks passing between said arm-connecting portions of said U-shaped bars and having co-acting hooks at their outer ends, means securing one of said hook shanks to all of said bars, means pivoting the inner end of the other shank to said transverse bar, and a locking pin for normally holding said other shank against pivotal movement, said arm-connecting portions of the U-shaped bars having openings to receive said pin.

2. A structure as specified in claim 1; the ends of said transverse bar being folded upon themselves to properly space the U-shaped bars from each other.

In testimony whereof I have hereunto affixed my signature.

EDWIN B. ANDERSON.